US010319346B2

(12) United States Patent
Kikuchi et al.

(10) Patent No.: US 10,319,346 B2
(45) Date of Patent: Jun. 11, 2019

(54) METHOD FOR COMMUNICATING VIA VIRTUAL SPACE AND SYSTEM FOR EXECUTING THE METHOD

(71) Applicant: COLOPL, Inc., Tokyo (JP)

(72) Inventors: Eita Kikuchi, Tokyo (JP); Norihiro Kubo, Kanagawa (JP); Atsushi Inomata, Kanagawa (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/853,921

(22) Filed: Dec. 25, 2017

(65) Prior Publication Data

US 2018/0247612 A1 Aug. 30, 2018

(30) Foreign Application Priority Data

Dec. 26, 2016 (JP) ................................ 2016-250989

(51) Int. Cl.
*G06T 15/00* (2011.01)
*G09G 5/36* (2006.01)
(Continued)

(52) U.S. Cl.
CPC ........... *G09G 5/363* (2013.01); *G02B 27/017* (2013.01); *G06F 3/0325* (2013.01);
(Continued)

(58) Field of Classification Search
CPC .......... G09G 5/363; G09G 5/02; G09G 5/373; G09G 2354/00; G09G 2340/0407;
(Continued)

(56) References Cited

U.S. PATENT DOCUMENTS

| | | | | |
|---|---|---|---|---|
| 8,271,046 B2 * | 9/2012 | Kim | ...................... | H04M 1/576 455/412.1 |
| 8,676,272 B2 * | 3/2014 | Kim | ...................... | H04M 1/576 455/412.1 |

(Continued)

FOREIGN PATENT DOCUMENTS

| | | |
|---|---|---|
| JP | 2009-95030 A | 4/2009 |
| JP | 2013-518351 A | 5/2013 |

(Continued)

OTHER PUBLICATIONS

Billinghurst M, Bowskill J, Jessop M, Morphett J. A wearable spatial conferencing space. InWearable Computers, 1998. Digest of Papers. Second International Symposium on Oct. 19, 1998 (pp. 76-83). IEEE.*

(Continued)

*Primary Examiner* — Phu K Nguyen
(74) *Attorney, Agent, or Firm* — Hauptman Ham, LLP

(57) ABSTRACT

A method includes defining a virtual space to be associated with a first user. The virtual space includes a second avatar associated with a second user. The virtual space is associated with a first head-mounted device (HMD) connectable to a first computer. The method further includes receiving a signal transmitted from a second computer associated with a second user. The method further includes detecting a communication quality between the first computer and the second computer based on the signal. The method further includes displaying the second avatar in the virtual space based on the detected communication quality.

20 Claims, 20 Drawing Sheets

(51) Int. Cl.

| | |
|---|---|
| ***G06T 3/40*** | (2006.01) |
| ***G09G 5/02*** | (2006.01) |
| ***G09G 5/373*** | (2006.01) |
| ***G06F 3/03*** | (2006.01) |
| ***G06F 3/0346*** | (2013.01) |
| ***G02B 27/01*** | (2006.01) |
| ***G06F 3/147*** | (2006.01) |
| ***G09G 3/00*** | (2006.01) |
| ***G09G 5/14*** | (2006.01) |
| *G06F 3/0484* | (2013.01) |

(52) U.S. Cl.

CPC ............ *G06F 3/0346* (2013.01); *G06F 3/147* (2013.01); *G06T 3/4092* (2013.01); *G09G 3/002* (2013.01); *G09G 5/02* (2013.01); *G09G 5/026* (2013.01); *G09G 5/14* (2013.01); *G09G 5/373* (2013.01); *G02B 27/0172* (2013.01); *G02B 2027/014* (2013.01); *G02B 2027/0187* (2013.01); *G06F 3/04842* (2013.01); *G09G 2320/0666* (2013.01); *G09G 2340/045* (2013.01); *G09G 2340/0407* (2013.01); *G09G 2340/10* (2013.01); *G09G 2340/12* (2013.01); *G09G 2354/00* (2013.01); *G09G 2370/022* (2013.01); *G09G 2370/16* (2013.01)

(58) Field of Classification Search

CPC ...... G09G 2340/045; G09G 2320/0666; G06T 3/4092; G06F 3/04842; G02B 27/0172; G02B 2027/014

USPC .......................................................... 345/418

See application file for complete search history.

(56) References Cited

U.S. PATENT DOCUMENTS

| | | | |
|---|---|---|---|
| 2009/0098911 | A1 | 4/2009 | Kim et al. |
| 2011/0185286 | A1 | 7/2011 | Moyers et al. |

FOREIGN PATENT DOCUMENTS

| | | | |
|---|---|---|---|
| JP | 2013-175929 | A | 9/2013 |
| JP | 2016-152619 | A | 8/2016 |

OTHER PUBLICATIONS

Favim, https://favim.com/image/2619441/, Apr. 3, 2015, pp. 1-2.*
Notice of Allowance in JP Application No. 2016-250989, dated Oct. 24, 2017, 5pp.
Office Action in JP Application No. 2016-250989, dated Aug. 22, 2017, 6pp.

* cited by examiner

METHOD FOR COMMUNICATING VIA VIRTUAL SPACE AND SYSTEM FOR EXECUTING THE METHOD

RELATED APPLICATIONS

The present application claims priority to Japanese Patent Application No. 2016-250989 filed Dec. 26, 2016, the disclosure of which is hereby incorporated by reference herein in its entirety.

TECHNICAL FIELD

This disclosure relates to communication, and more particularly, to communication via a virtual space.

BACKGROUND

There is known a technology for communicating by using a virtual space. For example, in Japanese Patent Application Laid-open No. 2016-152619 (Patent Document 1), there is described a "system enabling a user to experience special communication to/from a specific user" (see "Abstract").

PATENT DOCUMENTS

[Patent Document 1] JP 2016-152619 A

SUMMARY

According to at least one embodiment of this disclosure, there is provided a method including defining a virtual space to be associated with a first user. The virtual space includes a second avatar associated with a second user. The virtual space is associated with a first head-mounted device (HMD) to be connected to a first computer. The second user is associated with a second HMD associated with a second computer communicably connected to the first computer. The method further includes receiving a signal transmitted from the second computer. The method further includes detecting a communication quality between the first computer and the second computer based on the signal. The method further includes determining a display mode of the second avatar in the virtual space in accordance with the communication quality. The method further includes displaying the second avatar in the virtual space based on the display mode.

The above-mentioned and other objects, features, aspects, and advantages of the disclosure may be made clear from the following detailed description of this disclosure, which is to be understood in association with the attached drawings.

DETAILED DESCRIPTION

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

Figure 1:
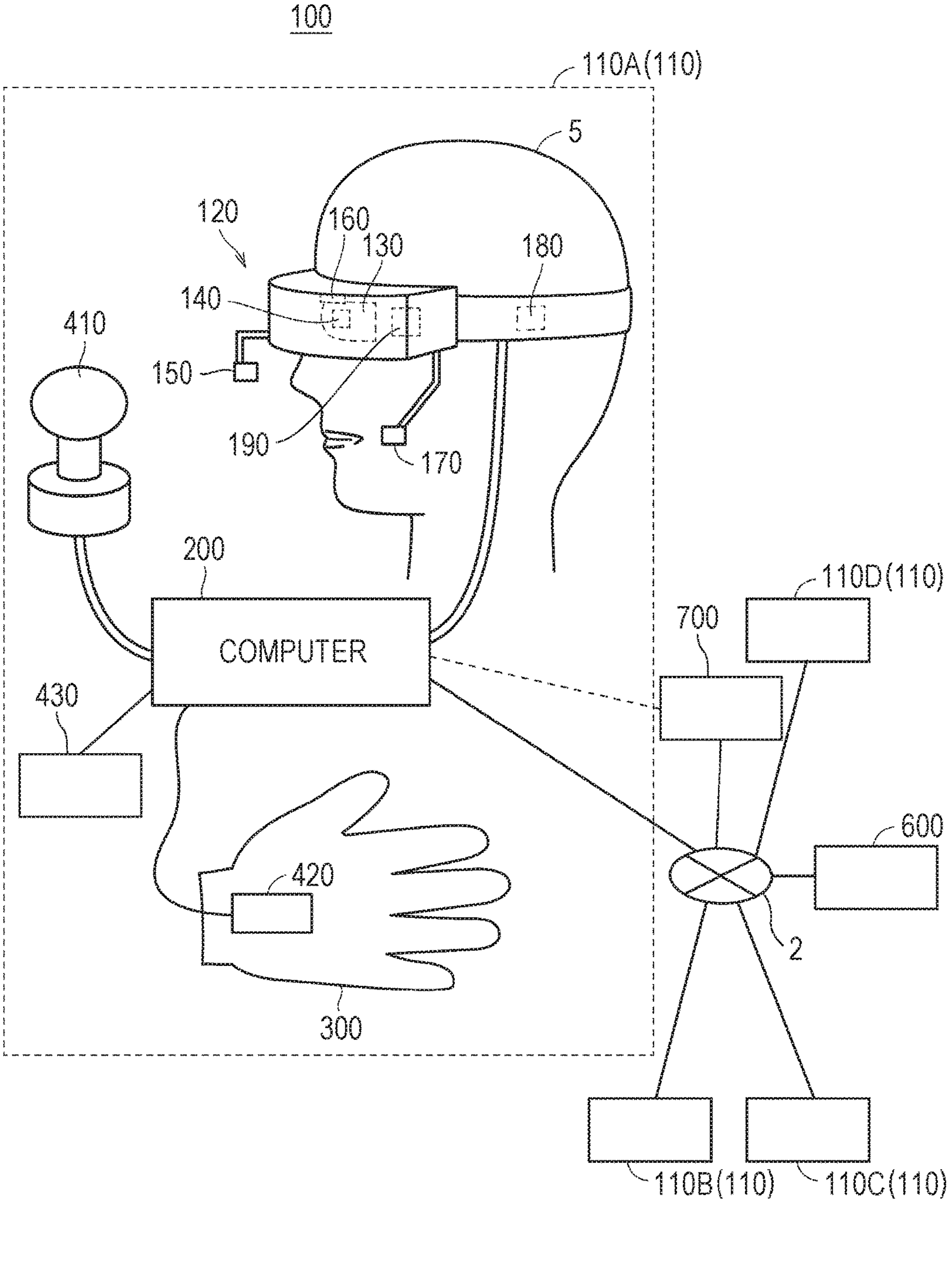
FIG. 1 A diagram of a system including a head-mounted device (HMD) according to at least one embodiment of this disclosure.

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
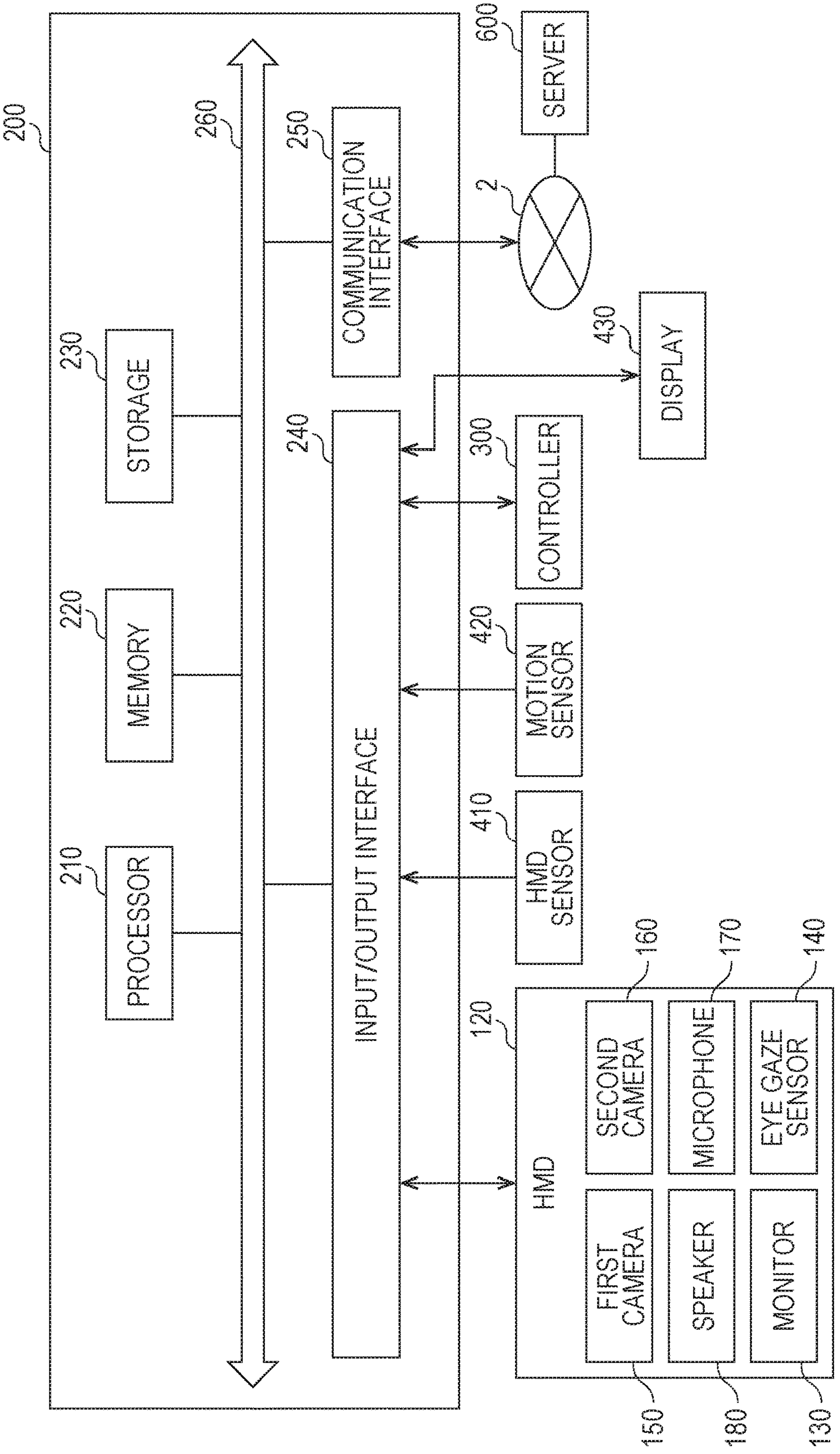
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes anyone of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth®, near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-Field Coordinate System]

Figure 3:
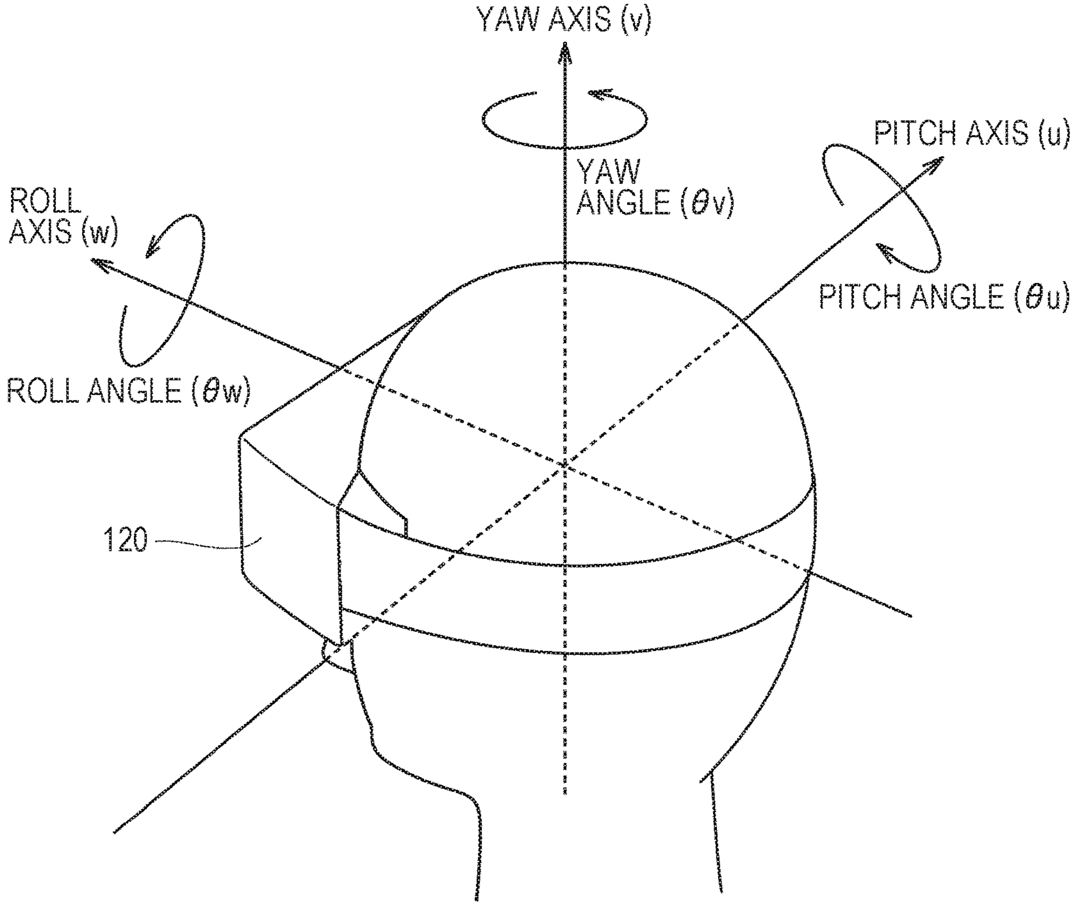
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle (θu), a yaw angle (θv), and a roll angle (θw) of the HMD 120 in the uvw visual-field coordinate system. The pitch angle (θu) represents an inclination angle of the HMD 120 about the pitch axis in the uvw visual-field coordinate system. The yaw angle (θv) represents an inclination angle of the HMD 120 about the yaw axis in the uvw visual-field coordinate system. The roll angle (θw) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
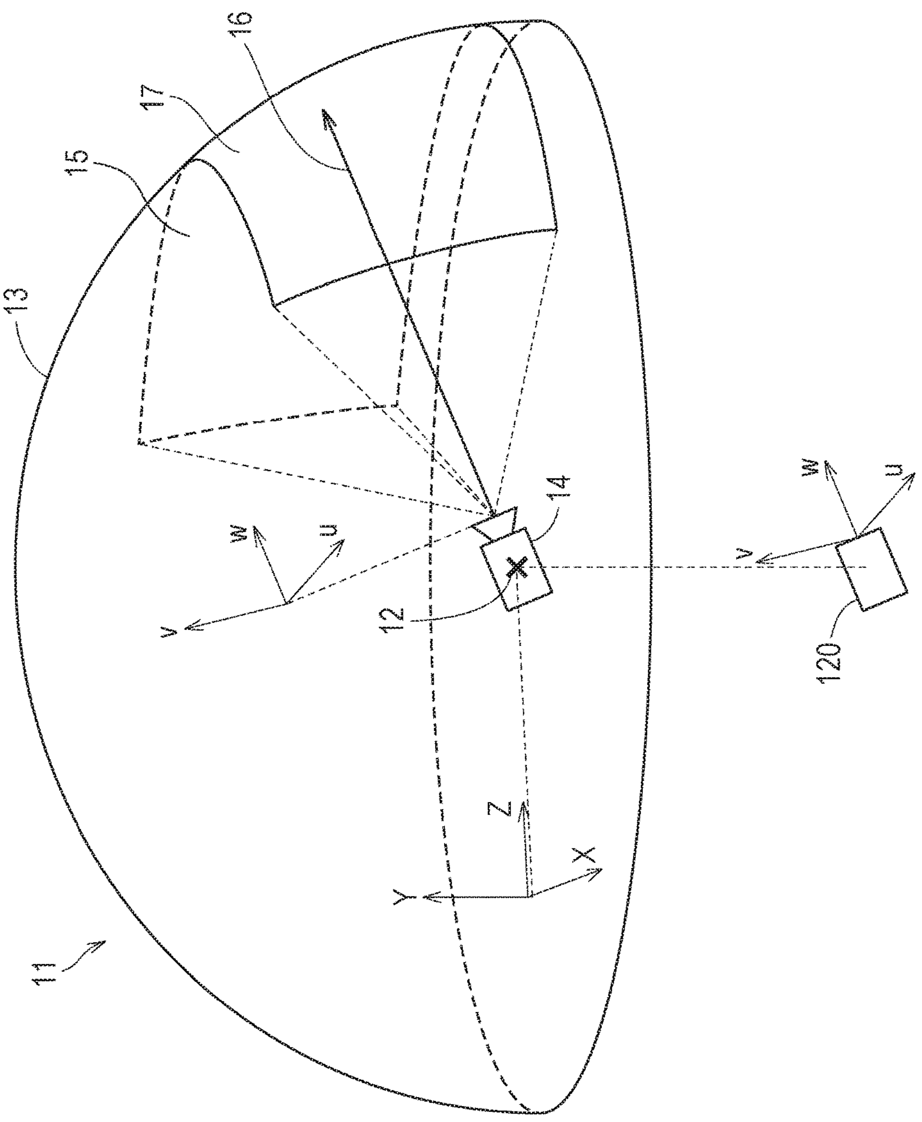
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
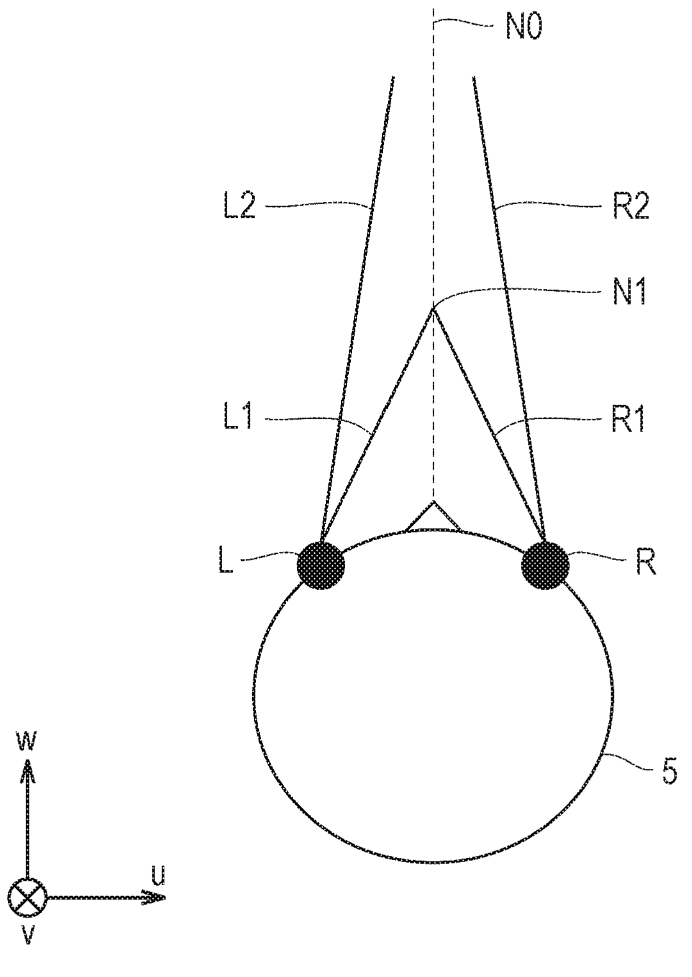
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values.

Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight NO corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-View Region]

Figure 6:
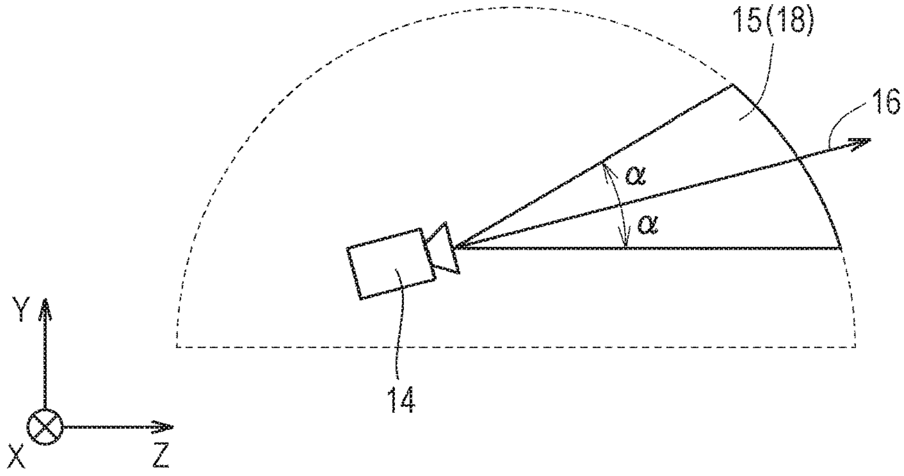
FIG. 6 A diagram of a YZ cross section obtained by viewing a field-of-view region from an X direction in the virtual space according to at least one embodiment of this disclosure.
Figure 7:
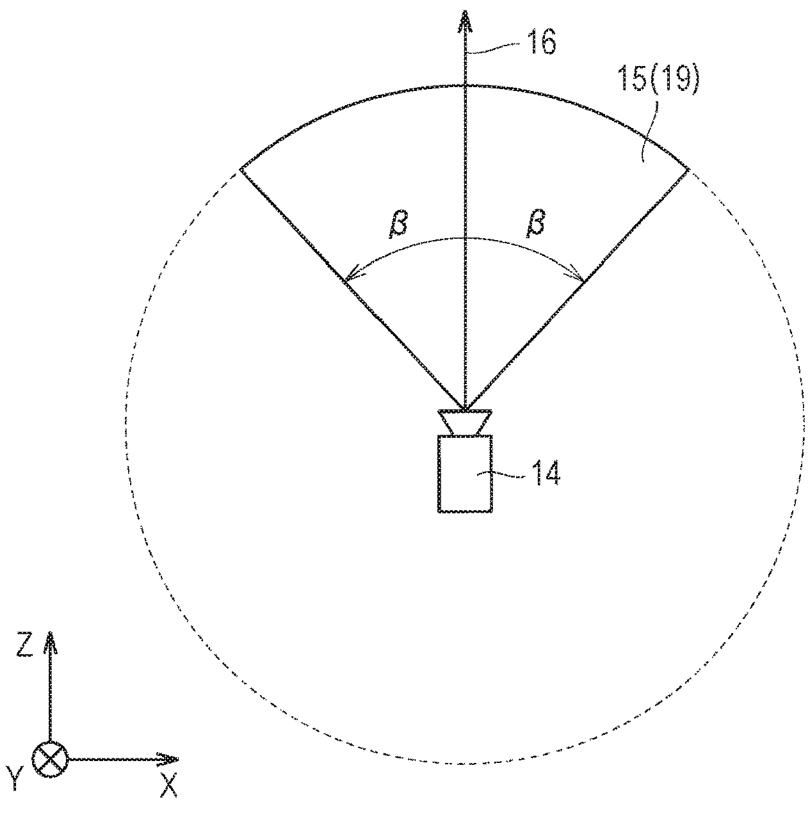
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle α from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth β from the reference line of sight 16 serving as the center in the virtual space 11 as the region 19. The polar angle α and β are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to a part of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
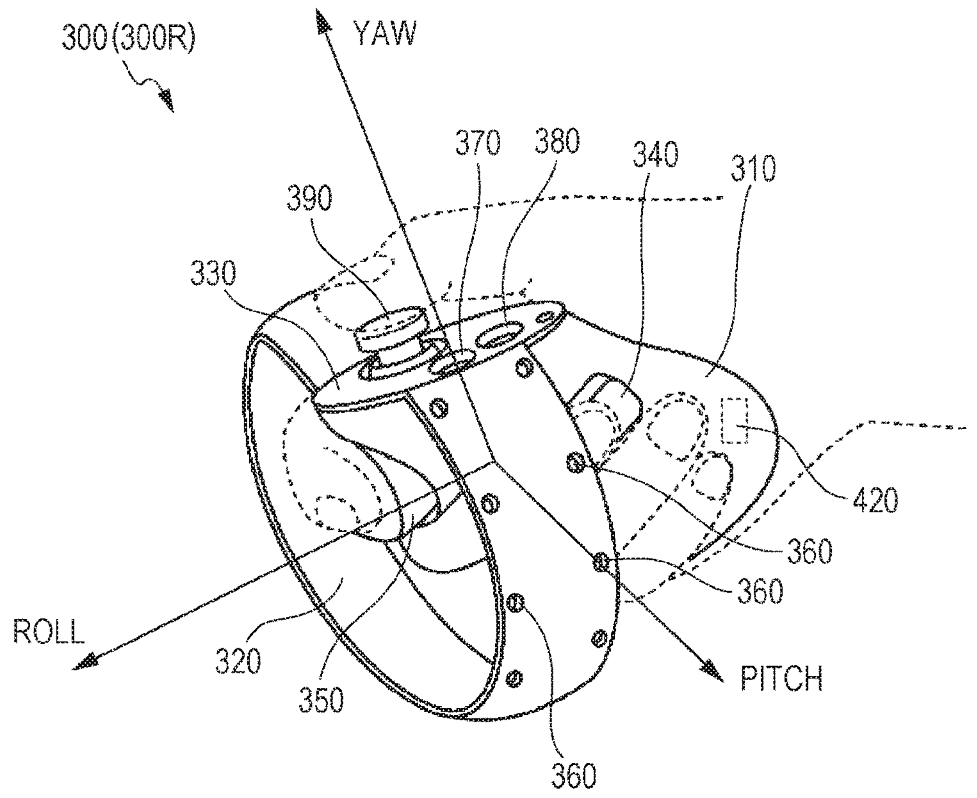
FIG. 8A A diagram of a schematic configuration of a controller according to at least one embodiment of this disclosure.
Figure 8B:
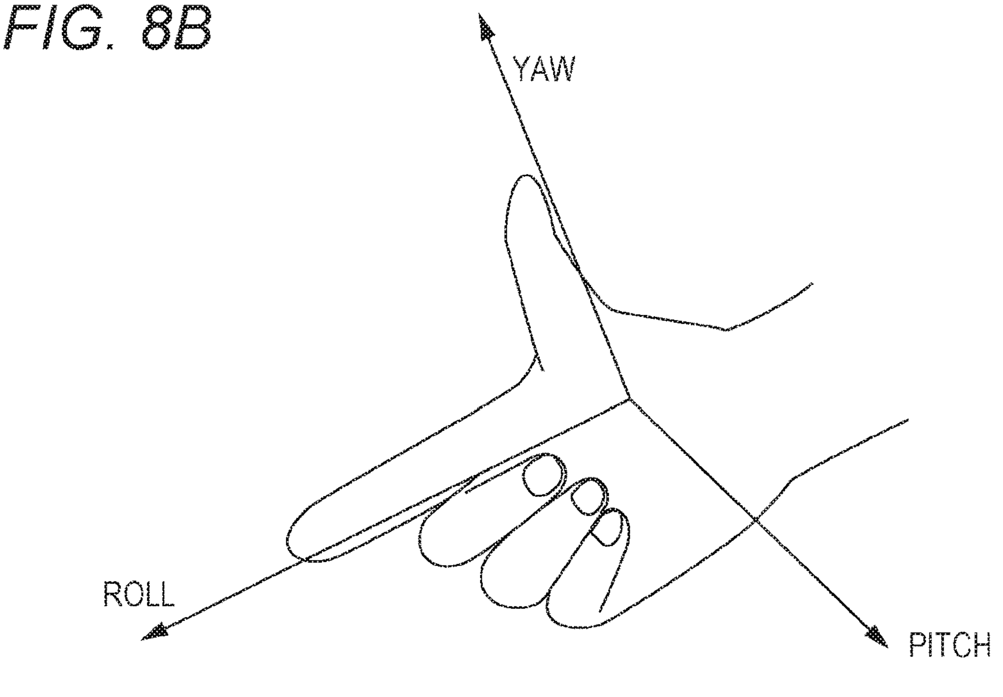
FIG. 8B A diagram of an example of a yaw direction, a roll direction, and a pitch direction that are defined with respect to a right hand of the user according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity. The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor

420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIG. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane defined by the yaw-direction axis and the roll-direction axis when the user 5 extends his or her thumb and index finger is defined as the pitch direction.

[Hardware Configuration of Server]

Figure 9:
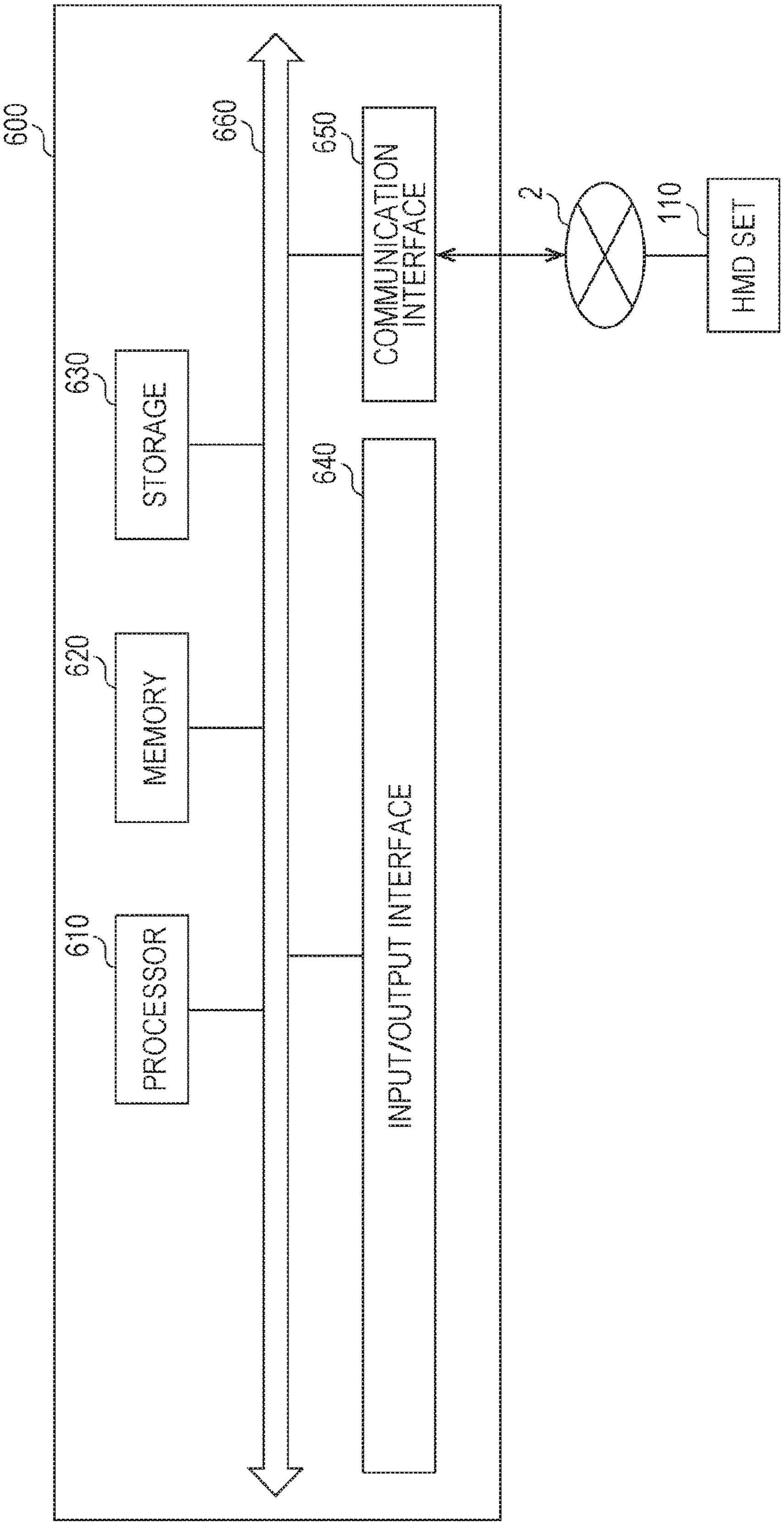
FIG. 9 A block diagram of a hardware configuration of a server according to at least one embodiment of this disclosure.

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
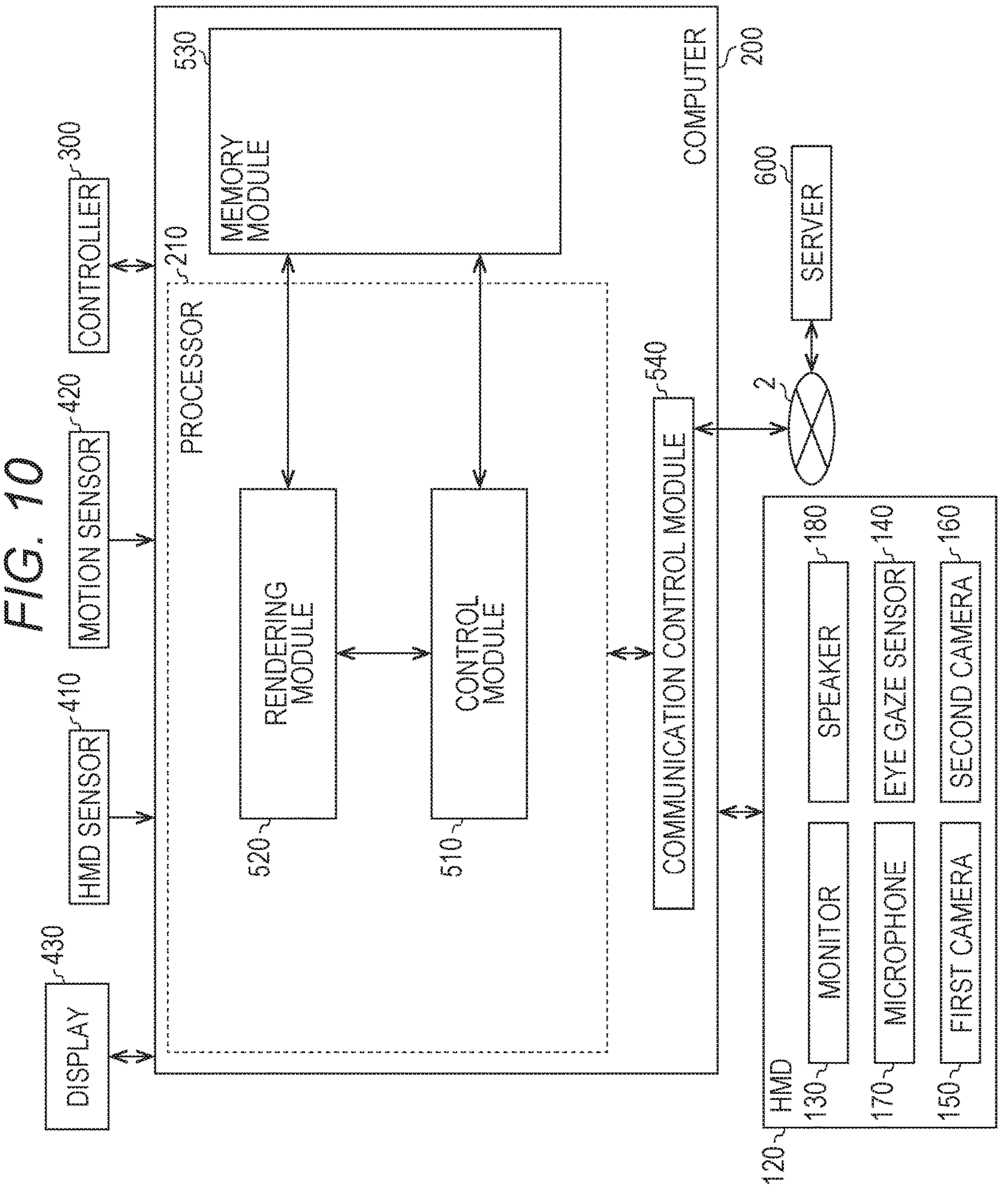
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity® provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

Figure 11:
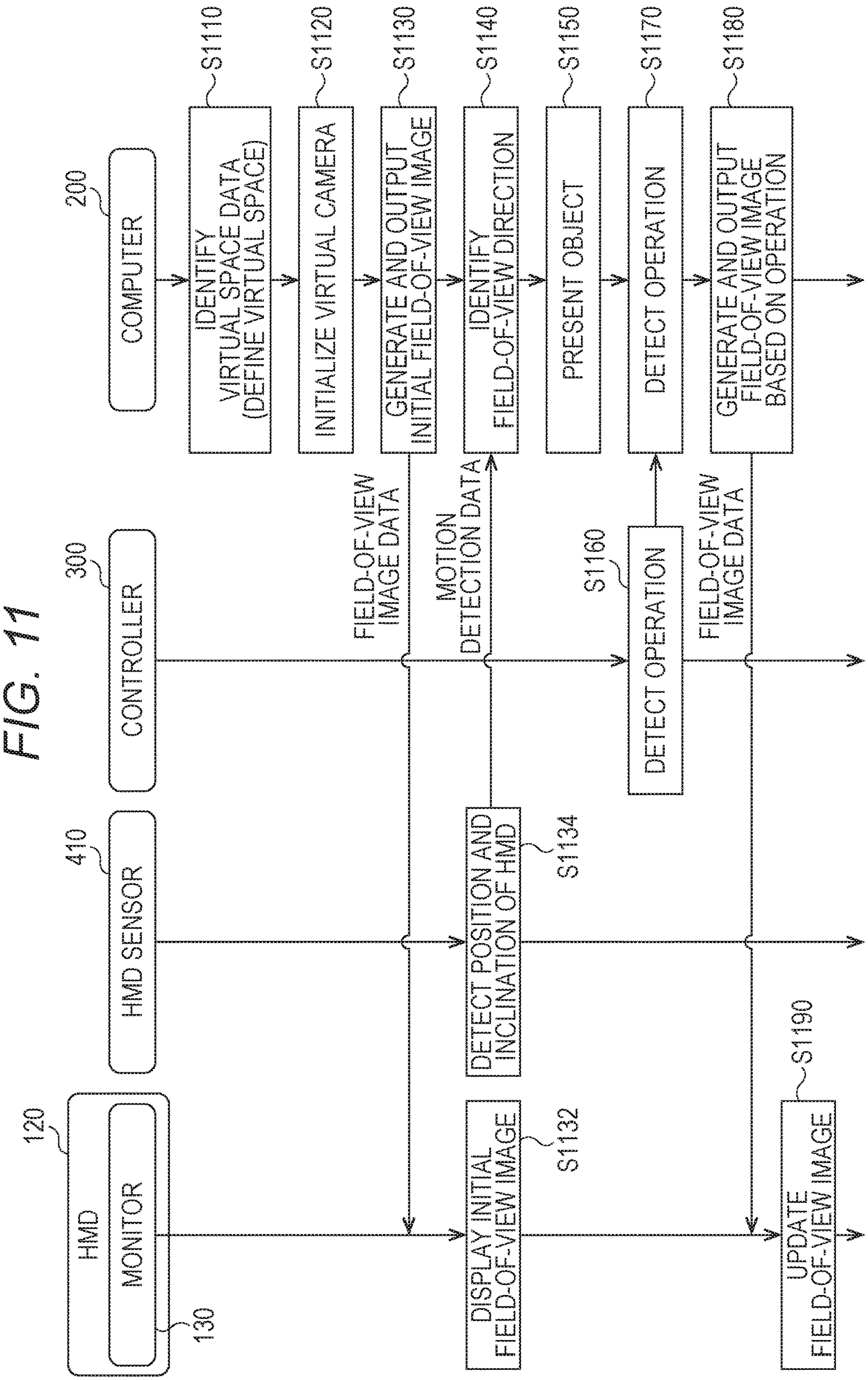
FIG. 11 A sequence chart of processing to be executed by a system including an HMD set according to at least one embodiment of this disclosure.

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
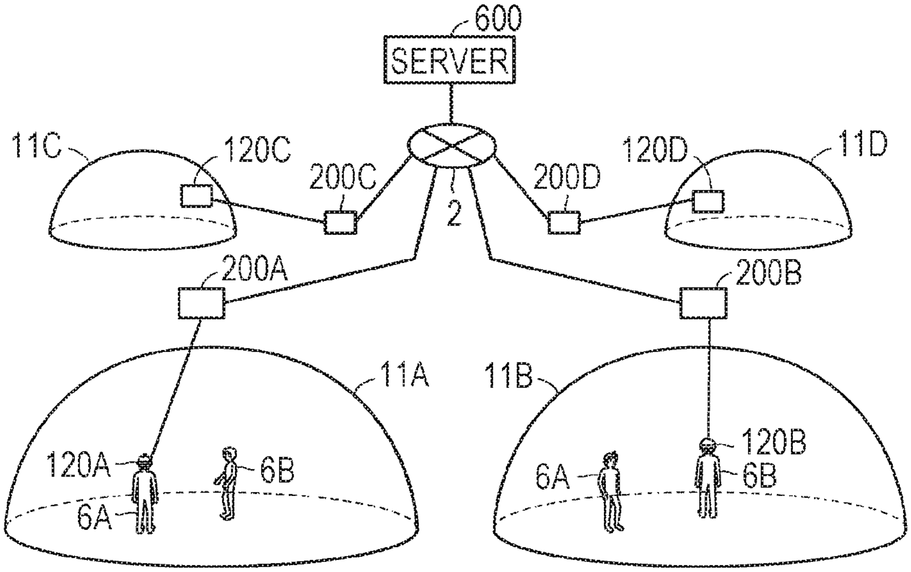
FIG. 12A A schematic diagram of HMD systems of several users sharing the virtual space interact using a network according to at least one embodiment of this disclosure.
Figure 12B:
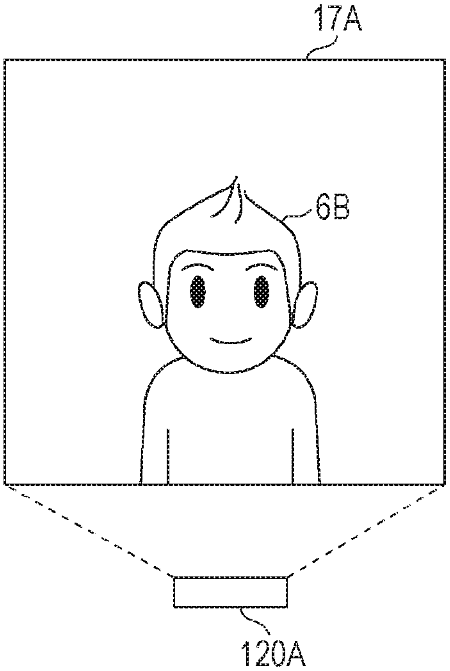
FIG. 12B A diagram of a field-of-view image of a user 5A in FIG. 12A according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12(B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

Figure 13:
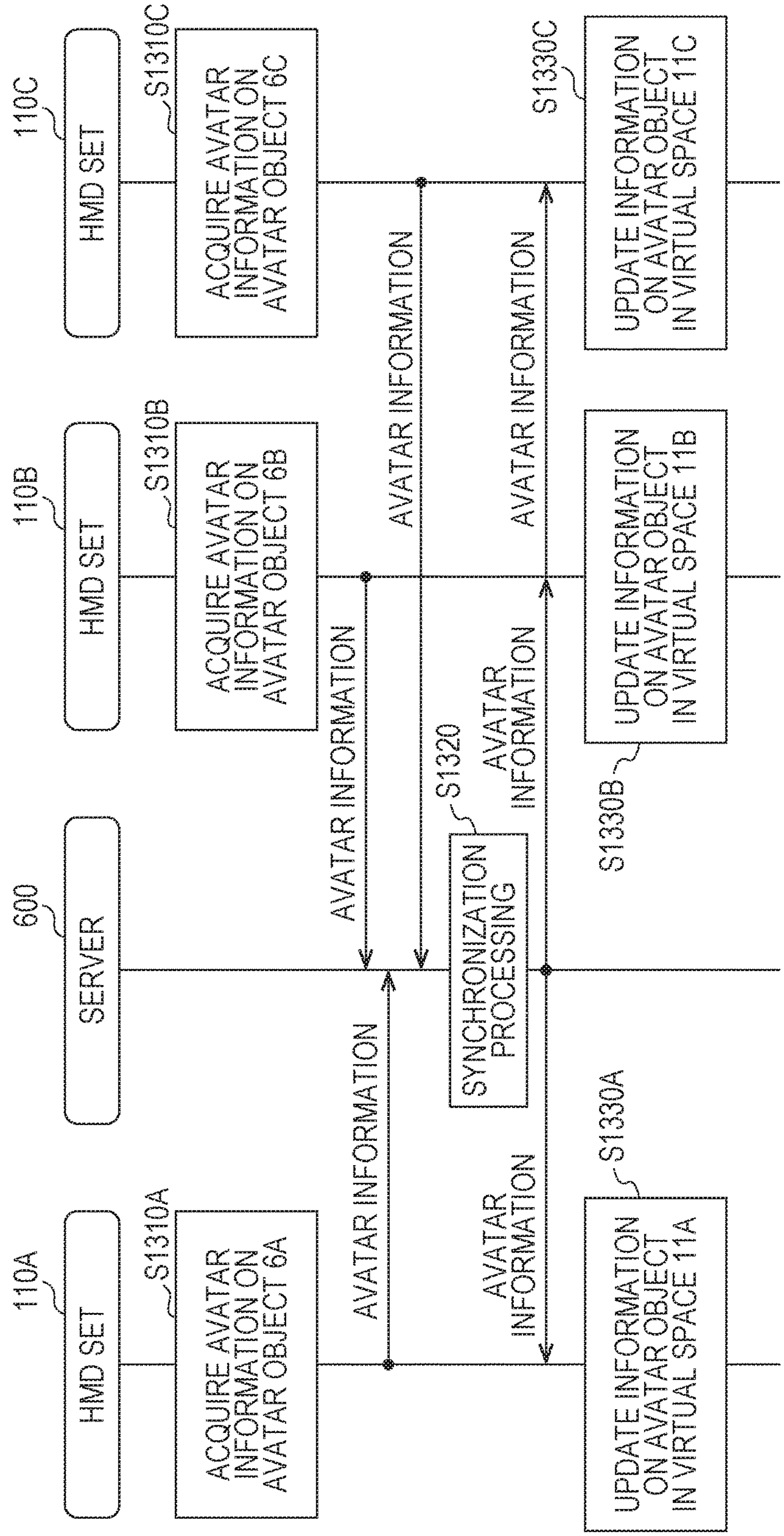
FIG. 13 A sequence diagram of processing to be executed by a system including an HMD interacting in a network according to at least one embodiment of this disclosure.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Detailed Configuration of Modules]

Figure 14:
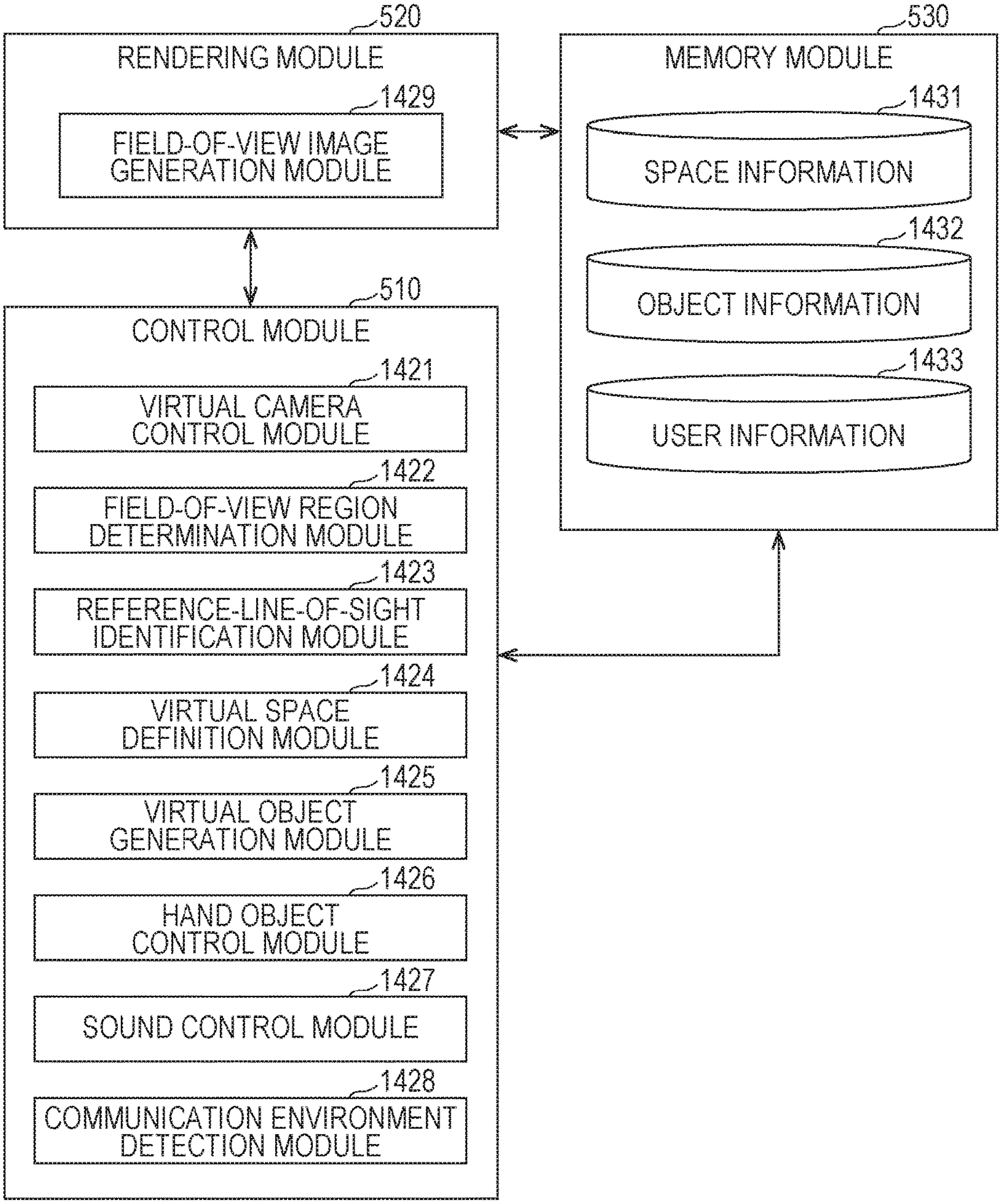
FIG. 14 A block diagram of a detailed configuration of modules of the computer according to at least one embodiment of this disclosure.

Now, with reference to FIG. 14, a description is given of a detailed configuration of modules of the computer 200. FIG. 14 is a block diagram of the detailed configuration of modules of the computer 200 according to at least one embodiment of this disclosure.

In FIG. 14, the control module 510 includes a virtual camera control module 1421, a field-of-view region determination module 1422, a reference-line-of-sight identification module 1423, a virtual space definition module 1424, a virtual object generation module 1425, an avatar object control module 1426, a sound control module 1427, and a communication environment detection module 1428. The rendering module 520 includes a field-of-view image generation module 1429. The memory module 530 stores space information 1431, object information 1432, and user information 1433.

In at least one aspect, the control module 510 controls display of an image on the monitor 130 of the HMD 120. The virtual camera control module 1421 arranges the virtual camera 14 in the virtual space 11, and controls, for example, the behavior and direction of the virtual camera 14. The field-of-view region determination module 1422 defines the field-of-view region 15 in accordance with the direction of the head of the user 5 wearing the HMD 120. The field-of-view image generation module 1429 generates a field-of-view image to be displayed on the monitor 130 based on the determined field-of-view region 15. Further, the field-of-view image generation module 1429 generates a field-of-view image based on data received from the control module 510. Data on the field-of-view image (also referred to as "field-of-view image data") generated by the field-of-view image generation module 1429 is output to the HMD 120 by the communication control module 540. The reference-line-of-sight identification module 1423 identifies the line of sight of the user 5 based on the signal from the eye gaze sensor 140.

When the sound control module 1427 detects from the HMD 120 an utterance using the microphone 170 of the user 5, the sound control module 1427 identifies the computer 200 to which sound data corresponding to the utterance is to be transmitted. The sound data is transmitted to the computer 200 identified by the sound control module 1427. When the sound control module 1427 receives the sound data from the computer 200 of another user via the network 2, the sound control module 1427 outputs a sound (utterance) corresponding to that sound data from the speaker 180.

The control module 510 controls the virtual space 11 to be provided to the user 5. First, the virtual space definition module 1424 generates virtual space data representing the virtual space 11, to thereby define the virtual space 11 in the HMD set 110.

The virtual object generation module 1425 generates data on objects to be arranged in the virtual space 11. The objects may include, for example, another avatar object and a virtual vehicle. Data generated by the virtual object generation module 1425 is output to the field-of-view image generation module 1429.

The avatar object control module 1426 generates avatar objects of the users communicating via the virtual space 11, and presents the generated avatar objects in the virtual space 11. In at least one aspect, the avatar object control module 1426 generates data for displaying the avatar object of the user having the worst communication environment among a plurality of communication partners in a mode different from the display mode of the avatar objects of the other users. For example, the avatar object control module 1426 presents the avatar object corresponding to a user of the HMD 120 having a communication environment that is lower than a standard determined in advance in a display mode different from the display mode of the avatar object corresponding to a user of an HMD having a communication environment equal to or higher than the standard determined in advance.

The communication environment includes, for example, the speed of the network, the resolution of a monitor incorporated in the HMD 120 or a monitor included in an information processing terminal mounted to the HMD 120, and the like. In at least one embodiment of this disclosure, the avatar object control module 1426 generates data for presenting each avatar object in a mode that depends on the worst communication environment among respective communication environments of one or more other HMDs. In at least one embodiment of this disclosure, the avatar object control module 1426 generates data for presenting in the virtual space an avatar object in accordance with the image quality of the monitor. In at least one embodiment of this disclosure, when the speed of communication to/from each HMD is lower than a speed determined in advance or when there is an HMD having a slower communication speed than the communication speed of the other HMDs, the avatar object control module 1426 generates data for presenting the avatar object in the virtual space at a lower resolution than the resolution determined in advance.

For example, in at least one embodiment, in response to a detection that the communication environment of any one of the computers 200B and 200C that the computer 200A communicates to/from is worse than the communication environment of another one of the computers 200B and 200C, the avatar object control module 1426 displays the avatar object of the user who is using the computer having that worse communication environment in a mode different from the avatar object of the user who is using the other of those computers. In at least one aspect, in response to a detection that the communication environment of the computer 200A is worse than the communication environments of the other computers 200B and 200C, the avatar object control module 1426 generates data for presenting in the virtual space 11 an object or a message notifying that fact, and outputs the generated data to the HMD 120. The HMD 120 displays the object or message on the monitor 130 based on that data. The user 5A is able to recognize that his/her own communication environment is worse than the communication environment of each of the other users 5B and 5C.

In at least one aspect, when the user 5A enters into the computer 200A via the controller 300 an input for selecting the avatar object presented in the virtual space 11, the avatar object control module 1426 generates data for presenting the avatar object selected based on the input in a mode different from the mode of the other avatar objects. In this case, because the user 5A designates the avatar object of the user having a poor communication environment based on his/her own judgment, the user 5 is put on notice to pay more attention to conversation and chat under conditions (e.g., speaking slowly) different from the conversation and chat utilized by other users having a better communication environment.

The communication environment detection module 1428 detects the communication environment between the computer 200A and each of the other computers 200B and 200C. For example, in at least one aspect, the communication environment detection module 1428 detects the network speed. The speed is detected by, for example, detection using a ping command, detection using an ftp command, detection using a ttcp command, and the like.

In at least one aspect, the communication environment detection module 1428 detects the resolution of a monitor displaying images based on data from the other computers 200B and 200C that the computer 200A communicates to/from. This monitor may be, for example, the monitor 130 incorporated in the HMD 120, or a monitor incorporated in a smartphone or some other information communication terminal mounted to the HMD 120. For example, the communication environment detection module 1428 acquires the resolution and other specifications of each monitor from the monitor itself or from the HMD 120 or information communication terminal including the monitor. In at least one aspect, the communication environment detection module 1428 acquires the specifications from the server 600 or some other information management apparatus that possesses the specifications of each monitor.

The space information 1431 stores one or more templates defined to provide the virtual space 11.

The object information 1432 stores content to be reproduced in the virtual space 11 and information for arranging an object to be used in the content. The content may include, for example, game content and content representing landscapes that resemble those of the real world.

The user information 1433 stores, for example, a program for causing the computer 200A to function as a control device for the HMD set 110 and an application program that uses each piece of content stored in the object information 1432.

[Control Structure]

Figure 15:
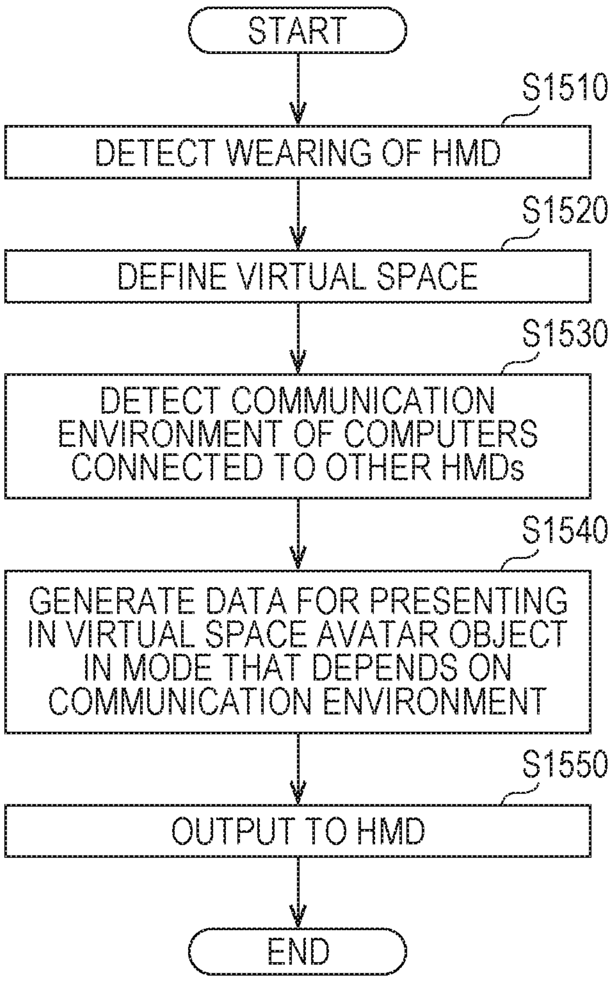
FIG. 15 A flowchart of processing to be executed according to at least one embodiment of this disclosure.

The control structure of the computer 200A is now described with reference to FIG. 15. FIG. 15 is a flowchart of a part of processing to be executed by the computer 200A according to at least one embodiment of this disclosure. The computer 200A is connected to the other computers 200B and 200C via the network 2. The computer 200B is connected to the HMD 120B worn by another user 5B. The computer 200C is connected to the HMD 120C worn by another user 5C.

In Step S1510, the processor 210 detects that the HMD 120 is being worn on the head of the user 5 based on a signal sent from the HMD 120. In Step S1520, the processor 210 defines in the memory 220 the virtual space 11 to be presented by the HMD 120.

In Step S1530, the processor 210 detects, based on the data received from the server 600, the communication environments of the other computers 200B and 200C communicating to/from the computer 200A. The communication environment may be, for example, the transmission speed of sound data, the transmission speed of image data, a difference between those transmission speeds, the resolution of the monitor of the HMD used by those other users, and the like.

In Step S1540, the processor 210 generates data for displaying in the virtual space 11 the avatar object corresponding to each of the other users 5B and 5C in a mode that depends on the communication environment. For example, when the communication speed between the computer 200A and computer 200B is slower than the communication speed between the computer 200A and computer 200C, the processor 210 changes the color of the avatar object of the user 5B to a color different from the color of the avatar object of the another user 5C. In at least one aspect, the processor 210 presents the avatar object of the user 5B fainter than the avatar object of the user 5C. For example, the processor 210 may present a transparent object as the avatar object of the user 5B. In at least one aspect, when the resolution of the monitor 130 of the HMD 120C is lower than the resolution of the monitor 130 of the HMD 120, the processor 210 sets the resolution of the avatar object of the user 5B to be lower than the resolution of the avatar object of the user 5C so that the image quality of the avatar object of the user 5B is lower than the image quality of the avatar object of the user 5C.

In Step S1550, the processor 210 outputs the generated data to the HMD 120. Based on that data, the monitor 130 of the HMD 120 presents in the virtual space 11 an avatar object representing each of the users 5B and 5C. When the user 5 wearing the HMD 120 visually recognizes each avatar object, the user 5 may recognize the avatar object (e.g., avatar object of user 5B) displayed in a different mode from the display mode of the other avatar objects. This enables the user 5 to recognize that the communication environment of the user 5B has reduced quality, and hence the user 5 is able to perform an operation in accordance with the communication environment of that user. For example, when communicating (e.g., chatting) to/from the user 5B, the user 5 may talk more slowly than in the case of transmitting a message to the other user 5B or perform an operation in the virtual space 11 more slowly than usually used in communications with users having a better quality communication environment.

Figure 16:
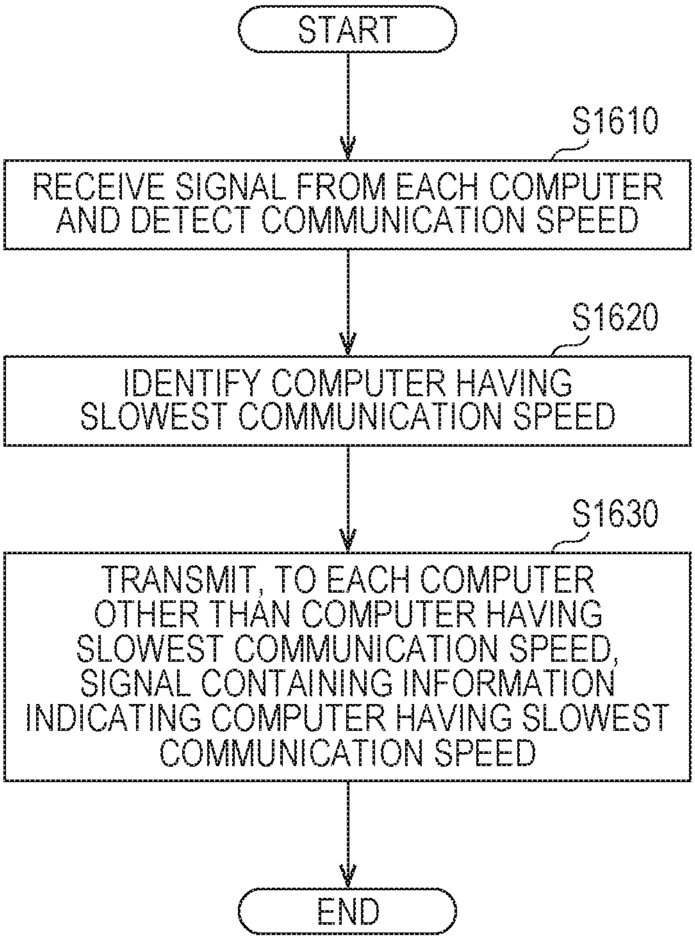
FIG. 16 A flowchart of processing to be executed according to at least one embodiment of this disclosure.

The control structure of the server 600 is now described with reference to FIG. 16. FIG. 16 is a flowchart of a part of processing to be executed by the processor 610 of the server 600 according to at least one embodiment of this disclosure. In at least one aspect, the server 600 is managed by a provider that provides a communication service via a virtual space. The processing in FIG. 16 is executed when at least two of the computers 200A, 200B, and 200C are able to communicate to/from each other. In the following, the processing is described based on the assumption that the computers 200, 200B, and 200C are in a mutually communicable state.

In Step S1610, the processor 610 receives a signal from each of the computers 200A, 200B, and 200C, and detects the speed of the communication of each computer to/from the other computers. In Step S1620, the processor 610 refers to the detected result, and identifies the computer having the slowest communication speed. In Step S1630, the processor 610 transmits to each of the computers other than the computer having the slowest communication speed a signal containing information indicating the computer having the slowest communication speed.

For example, in a given communication session, when the communication speed of the computer 200B is the slowest, the processor 610 transmits to the other computers 200A and 200C a signal including an identification number of the computer 200B and a symbol representing that the communication speed is the slowest. When that signal is received from the server 600, the processor 210 of each of the computers 200A and 200C associates and stores in the memory 220 the identification number of the session, the identification number of the computer 200B, and the symbol.

When the computer 200A receives the signal from the computer 200B, the processor 210 of the computer 200A creates an avatar object of the user 5B of the computer 200B based on the signal. At this time, the processor 210 refers to the memory 220 and confirms whether or not a computer having a slow communication speed is registered. For example, when information (identification number and symbol) on the computer 200B as a computer having a slow communication speed is stored in the memory 220, the processor 210 displays, in the case in which the avatar object of the user 5B is to be generated based on the data received from the computer 200B, the avatar object of the user 5B in a mode different from the display mode of the avatar object of the user 5C of the another computer 200C.

Figure 17:
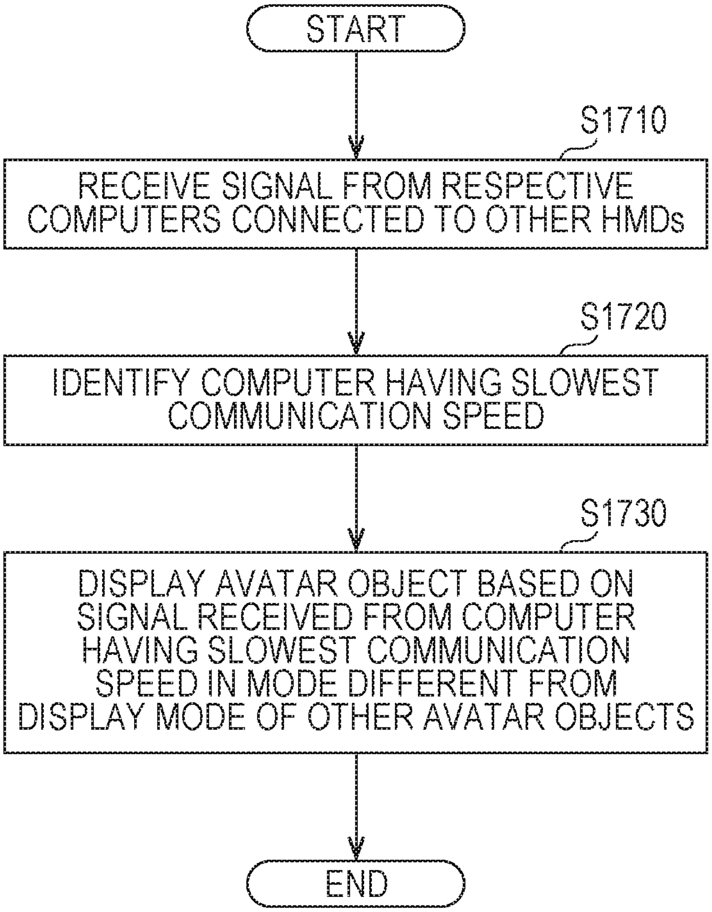
FIG. 17 A flowchart of processing to be executed according to at least one embodiment of this disclosure.

Yet another mode of detecting the communication environment is now described with reference to FIG. 17. FIG. 17 is a flowchart of processing to be executed according to at least one embodiment of this disclosure. Detection of the communication speed of each computer and other communication environments is not limited to the server 600 and each computer. For example, when the HMD 120 has an arithmetic function, the HMD 120 may also detect a computer having a slow communication speed. The control structure of the HMD 120 is now described with reference to FIG. 17.

In Step S1710, the processor of the HMD 120 receives, via the server 600 and the computer 200A, a signal transmitted from each of the computers 200B and 200C connected to the HMDs 120B and 120C, respectively. In Step S1720, the processor identifies the computer having the slowest communication speed based on the signal received from each computer. In Step S1730, the processor displays the avatar object based on the signal received from the computer having the slowest communication speed in a mode different from the display mode of the other avatar objects.

For example, the HMD 120 connected to the computer 200A identifies the computer having the slowest communication speed based on the signal transmitted from each of the computers 200B and 200C. The HMD 120 generates data for displaying the avatar object of the user of the identified computer in a mode different from avatar objects of the users of the other computers. The HMD 120 also displays an image on the monitor 130 based on the generated data.

Next, display modes of the avatar objects are described with reference to with FIG. 18 to FIG. 21. FIG. 18 to FIG. 21 are diagrams of examples of an image that is visually recognizable by the user as a field-of-view image according to at least one embodiment of this disclosure.

For example, when the user 5A operates the controller 300 to activate a chat application and instructs the start of chat in the virtual space 11, communication is established to/from the computers 200B and 200C used by the other users 5B and 5C who have executed the chat application and are in an online state at that time. Then, the avatar object of each communicable user is presented on each HMD 120. When communication is established, each computer 200A, 200B, and 200C, or the server 600 providing a chat service, detects the communication environment between each computer. The communication environment may be, for example, the communication speed, the image resolution, and the like.

Figure 18:
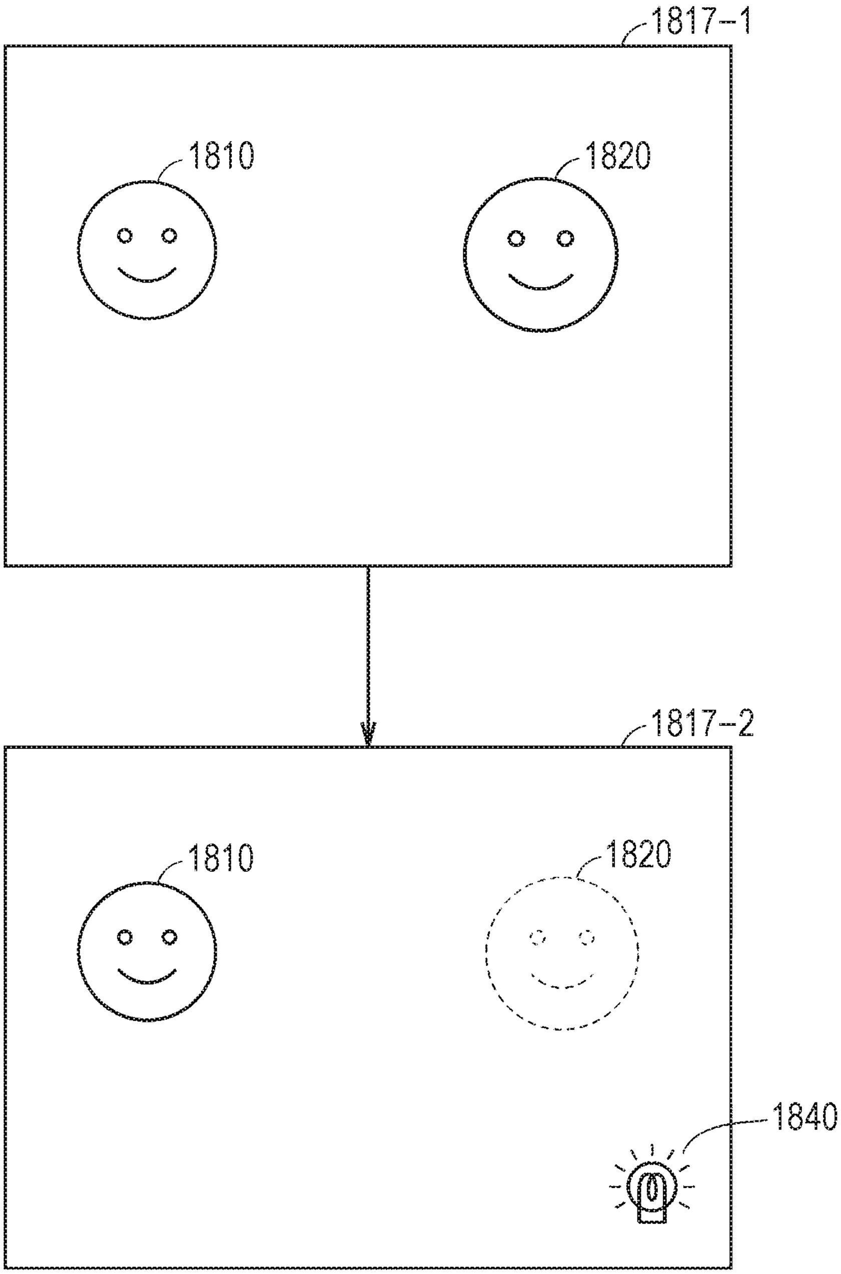
FIG. 18 A diagram of an example of an image that is visually recognizable by the user as the field-of-view image according to at least one embodiment of this disclosure.

In FIG. 18, in at least one aspect, the user 5 visually recognizes a field-of-view image 1817-1 presented by the HMD 120 connected to the computer 200A. The field-of-view image 1817-1 includes avatar objects 1820 and 1810 of the other computers 200B and 200C that the computer 200A is communicating with. The computer 200A may then detect that the communication state to/from the computer 200B is worse than the communication state to/from the computer 200C. Examples of the communication state being worse may include the communication speed to/from the computer 200B being slower than the communication speed to/from the computer 200C, the resolution of the monitor 130 of the HMD 120 connected to the computer 200B being lower than the resolution of the monitor 130 of the HMD 120 connected to the computer 200C, and the like.

In response to a determination that the communication state is worse, the avatar object 1820 is displayed in a mode different from the display mode of the avatar object 1810, in a field-of-view image 1817-2. For example, as indicated by the dotted line of the field-of-view image 1817-2, the avatar object 1820 is presented in the field-of-view image 1817-2 at a lower resolution than the resolution of the avatar object 1810.

Further, in at least one aspect, an object 1840 indicating that a user having a poor communication state is included as a chat partner is displayed in the field-of-view image 1817-2. Displaying the object 1840 enables the user 5 to easily recognize that such a user is present, and hence, for example, adjusting the speed of subsequent conversation is easier.

Figure 19:
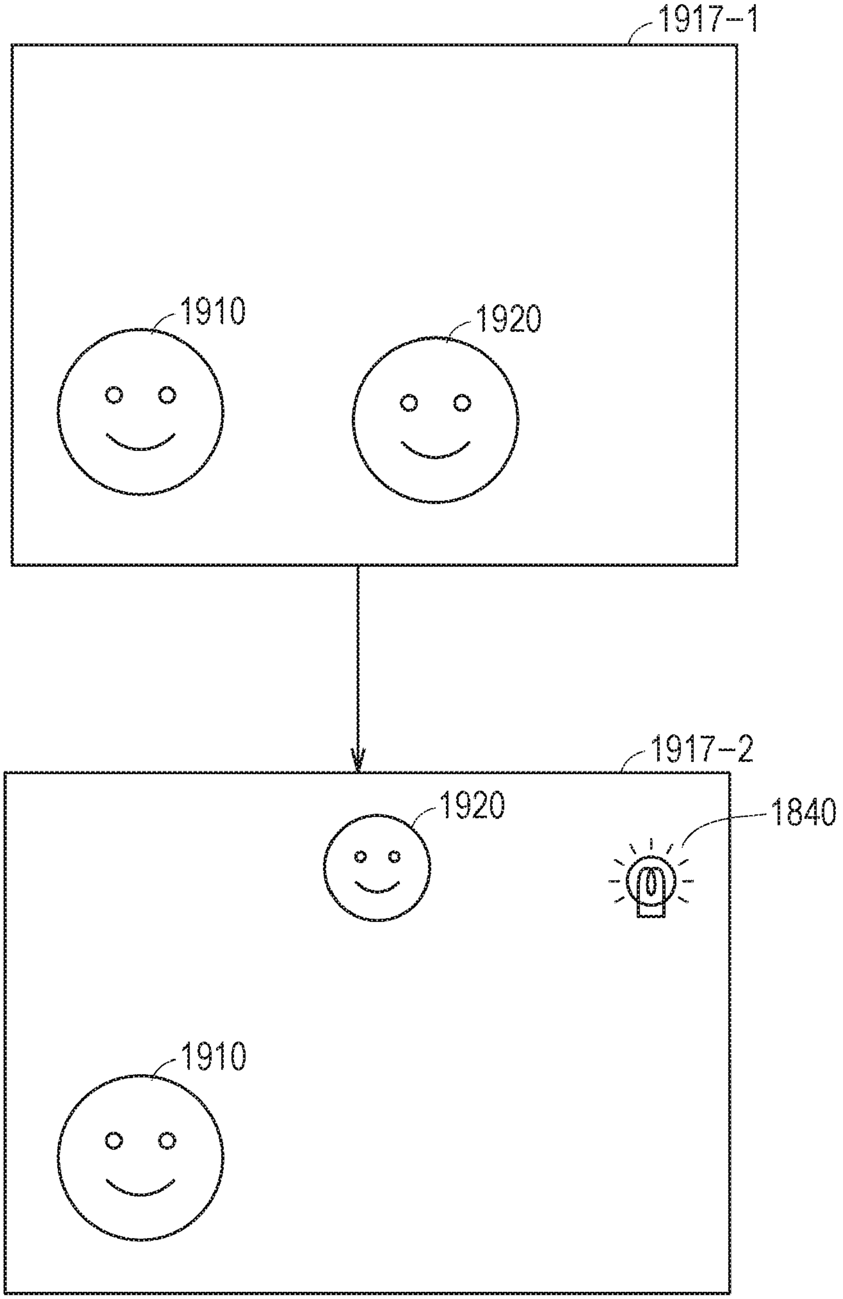
FIG. 19 A diagram of an example of another display mode of avatar objects to be included in the field-of-view image when a user having a poor communication state is included as a chat partner according to at least one embodiment of this disclosure.

FIG. 19 is a diagram of another display mode of the avatar objects to be included in the field-of-view image when a user having a poor communication state is included as a chat partner according to at least one embodiment of this disclosure.

When the computer 200A establishes communication with the computers 200B and 200C, as an initial state, a field-of-view image 1917-1 presents avatar objects 1920 and 1910 corresponding to the user of each of the computers 200B and 200C.

In the field-of-view image 1917-2, in response to a detection that the communication state to/from the computer 200B is poor, the size of the avatar object 1920 is decreased compared with the size of the avatar object 1910. The avatar object 1920 may be presented in a position separated from the avatar object 1910. The object 1840 may also be presented. When the user 5A recognizes a change in the display mode of the avatar object 1920, the user 5A is able to know that the communication environment of the computer 200B of the user 5B using the avatar object 1920 is worse than the communication environment of the computer 200C used by the user 5C. As a result, when the user 5A talks slowly, the user 5B is able to handle the utterances of the user 5, which allows each user to enjoy chatting via the virtual space 11 without feeling stress.

Figure 20:
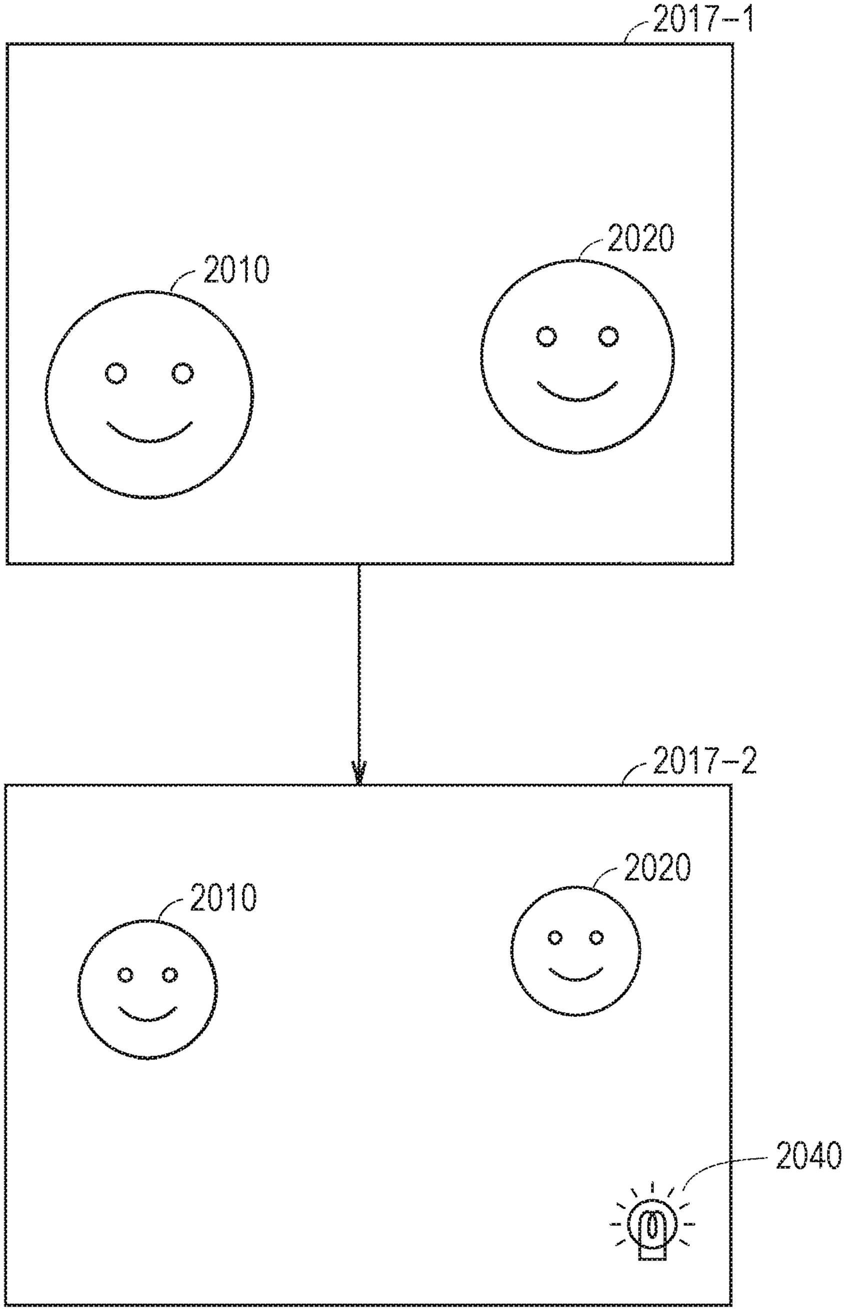
FIG. 20 A diagram of the field-of-view image to be presented by the HMD worn by the user of a computer having a poor communication speed according to at least one embodiment of this disclosure.

FIG. 20 is a diagram of the field-of-view image to be presented by the HMD 120B worn by the user 5B of the computer 200B having a poor communication speed according to at least one embodiment of this disclosure.

In a field-of-view image 2017-1, when communication is established between the user 5B and the other users 5A and 5C, the monitor 130 of the HMD 120B displays, as initial images, avatar objects 2010 and 2020 corresponding to the users 5A and 5C, respectively. Then, the computer 200B detects that its own communication environment is worse than the communication environment (e.g., communication speed and resolution of the monitor 130) of the other computers 200A and 200C. This detection is performed, for example, based on a measurement result of a known communication speed or based on a result notified from the server 600 as the detection result of the communication environment.

As a result of the detection, in a field-of-view image 2017-2, the avatar objects 2010 and 2020 may be presented at a more distant place than the initially presented place. The size of the avatar objects 2010 and 2020 may be decreased compared with when those avatar objects were initially presented. An object 2040 indicating that the communication environment of the computer 200B is worse than the communication environment of each of the other computers 200 and 200C for which communication is currently established is presented in the field-of-view image 2017-2. The user 5B recognizes that the communication environment of the computer 200B is not good by visually recognizing the object 2040 or a display mode like that described above of the avatar objects 2010 and 2020 included in the field-ofview image 2017-2. The user 5B is able to then proceed with chatting with other users 5A and 5C by, for example, reducing the amount of his/her utterances or transmitting a character-based message. As a result, stress caused by an inconsistent communication environment can be reduced.

Figure 21:
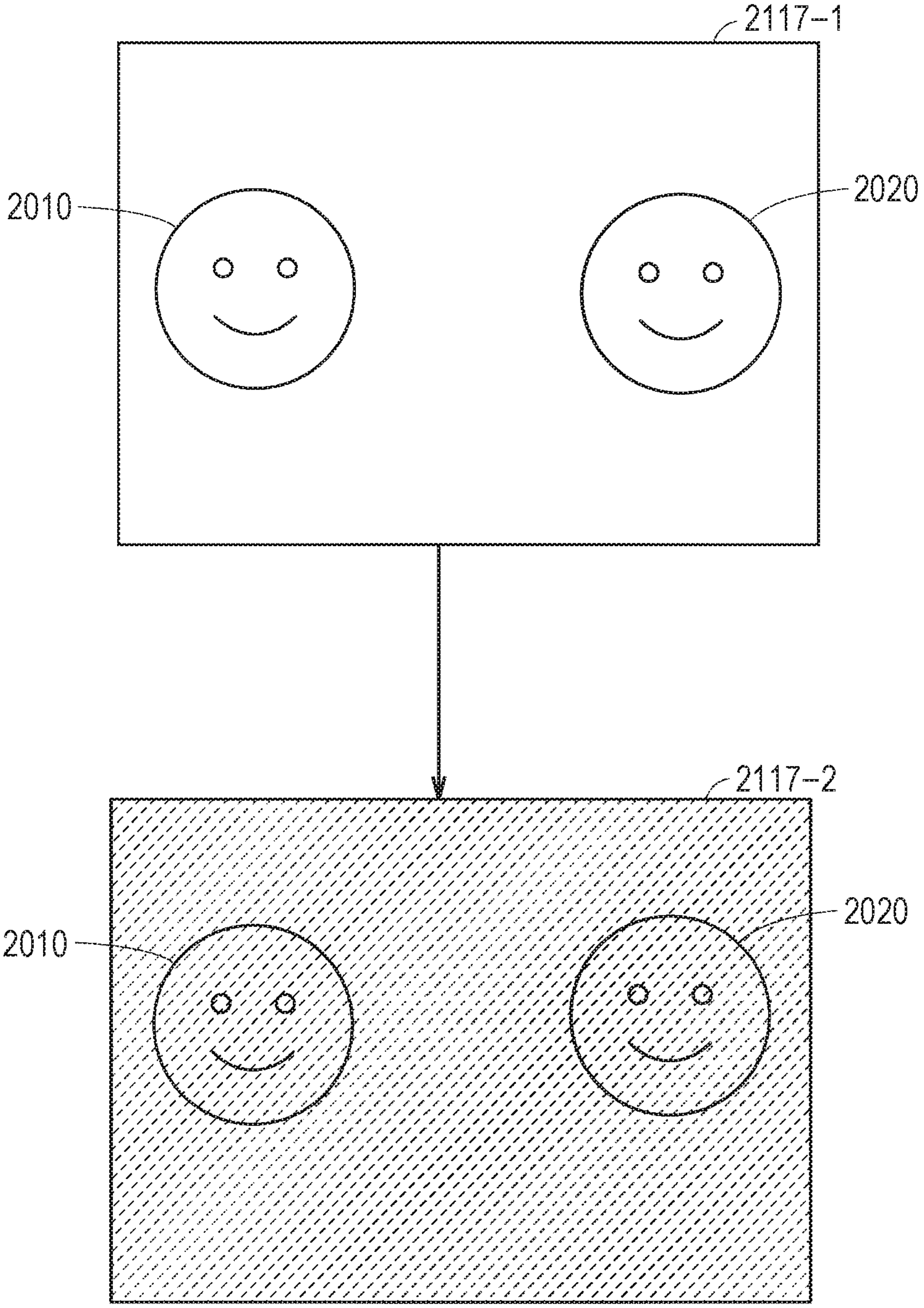
FIG. 21 A diagram of an example of an image that is visually recognizable by the user as the field-of-view image according to at least one embodiment of this disclosure.

FIG. 21 is a diagram of another example of the field-of-view image to be presented by the HMD 120B worn by the user 5B of the computer 200B having a poor communication speed according to at least one embodiment of this disclosure.

A field-of-view image 2117-1 represents an image of an initial state after communication to/from each computer is established. At this time, similar to the field-of-view image 2017-1 in FIG. 20, the field-of-view image 2117-1 includes avatar objects 2010 and 2020 shown in a normal display mode determined in advance. The computer 200B is then capable of detecting that that communication environment is worse than the communication environment of each of the other computers 200A and 200C.

In a field-of-view image 2117-2, the visibility of the field-of-view image 2117-1 may be reduced in response to this detection. For example, a blurring process is performed on the field-of-view image 2117-1, or the brightness of the screen is reduced. In this way, the user 5B is able to easily recognize that the communication environment of the computer 200B used by the user 5B is worse than the communication environment of the computer 200 or the computer 200C used by the chat partner. Therefore, in a subsequent chat, the user 5B takes an appropriate measure, such as adjusting his/her utterance speed, or increasing the frequency of using text messages that are less likely to be affected by deterioration in the communication environment. As a result, the stress of communicating via the virtual space 11 may be reduced.

As described above, in at least one embodiment of this disclosure, in a case in which two or more users 5A, 5B, 5C chat or communicate in some other way via the virtual space 11, when the communication environment of any one of the users is worse than the other users, the fact that the communication environment of that user is poor is notified to the relevant user, or that fact is notified to all the users who are communicating via the virtual space 11. For example, a message or an icon notifying that fact is displayed on the monitor of the HMD worn by the relevant user or the monitor of the computer used by the relevant user. In this way, that user is able to talk to the other users more slowly, or is able to inform the other users of the fact that his/her communication environment is poor and ask the other users to talk more slowly. As a result, each user is able to communicate in consideration of the other users, and hence stress may be reduced.

In at least one embodiment described above, there is described an example in which the fact that the communication environment of a given user is worse than the communication environment of each of the other users is notified to that given user. However, the notification destination is not limited to the given user. In at least one aspect, the notification is also notified to the other users. Exemplary modes of notifying may be the same as the mode in FIG. 18 to FIG. 21. In this way, the other users are able to easily recognize that a user having a poor communication environment is included as a communication partner. Proposing to the communication partners, including the user having a poor communication environment, measures such as talking more slowly, or employing text communication in place of talking is easier. As a result, communication is performed more smoothly.

The above-mentioned technical features of at least one embodiment are summarized as follows, for example.

(Configuration 1)

According to at least one embodiment of this disclosure, there is provided a method to be executed on a computer (e.g., 200A, 200B, or 200C) to communicate via a virtual space 11, or a non-transitory computer-readable data recording medium having stored thereon a command for causing a computer to implement the method. The method includes defining the virtual space 11 to be provided by an HMD 120 connected to the computer 200A. The method further includes detecting, based on signals transmitted from other apparatus (e.g., computers 200B and 200C, HMDs 120B and 120C, and server 600) communicably connected to the computer 200, communication environments of the other apparatus. The method further includes presenting in the virtual space 11 an avatar object corresponding to each of users 5B and 5C of the other HMDs 120B and 120C in a mode that depends on the communication environments.

(Configuration 2)

According to at least one embodiment of this disclosure, the presenting of the avatar object in the virtual space 11 includes presenting the avatar object corresponding to a user (e.g., any one of HMD 120B or 120C) of the HMD 120 having a communication environment that is lower than a standard determined in advance in a display mode different from a display mode of an avatar object corresponding to a user of an HMD having a communication environment equal to or higher than the standard determined in advance.

(Configuration 3)

According to at least one embodiment of this disclosure, the presenting of the avatar object in the virtual space 11 includes presenting each avatar object in a mode that depends on the worst communication environment among respective communication environments of one or more other HMDs.

(Configuration 4)

According to at least one embodiment of this disclosure, the detecting of the communication environments includes receiving information representing an image quality of the head-mounted device, and the presenting of the avatar object in the virtual space 11 includes presenting in the virtual space 11 the avatar object in accordance with the image quality.

(Configuration 5)

According to at least one embodiment of this disclosure, the detecting of the communication environments includes detecting a speed of communication to/from the other HMDs 120B and 120C, and the presenting of the avatar object in the virtual space 11 includes presenting, when the communication speed is lower than a speed determined in advance or when the speed of communication to/from anyone of the HMDs is lower than the speed of communication to/from the other HMDs, the avatar object in the virtual space 11 at a lower resolution than a resolution determined in advance.

(Configuration 6)

According to at least one embodiment of this disclosure, the method further includes receiving user input for selecting an avatar object presented in the virtual space 11, and the presenting of the avatar object in the virtual space 11 includes presenting the avatar object selected based on the user input in a mode different from a mode of other avatar objects.

(Configuration 7)

According to at least one embodiment of this disclosure, there is provided a system for executing any one of the methods described above on the computers 200A, 200B, and 200C.

(Configuration 8)

According to at least one embodiment of this disclosure, there is provided a computer 200 including: a memory 220 having stored thereon the program described above; and a processor 210 for executing the program.

It is to be understood that the embodiments disclosed herein are merely examples in all aspects and in no way intended to limit this disclosure. The scope of this disclosure is defined by the appended claims and not by the above description, and it is intended that this disclosure encompasses all modifications made within the scope and spirit equivalent to those of the appended claims.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, it is possible to exert action on the target object based on motion of the hand of the user.

The invention claimed is:

1. A method, comprising:

defining a virtual space to be associated with a first user,
  wherein the virtual space comprises a second avatar associated with a second user,
  wherein the first user is associated with a first head-mounted device (HMD) connectable to a first computer;

receiving a first signal from a second computer associated with a second user different from the first user;

detecting a first communication speed between the first computer and the second computer based on the first signal; and displaying the second avatar in a mode in response to the detected communication speed.

2. The method according to claim 1, wherein the displaying of the second avatar comprises displaying the second avatar in a first mode in response to the communication speed being lower than a given value, and wherein the displaying of the second avatar comprises displaying the second avatar in a second mode, different from the first mode, in response to the communication speed being equal to or higher than the given value.

3. The method according to claim 1, further comprising:

receiving a second signal transmitted from a third computer associated with a third user;

detecting a second communication speed between the first computer and the third computer based on the second signal;

comparing that the first communication speed with the second communication speed; and displaying a third avatar associated with the third user in the virtual space in a mode in response to results of the comparison, wherein the displaying of the second avatar comprises displaying the second avatar in a mode in response to the results of the comparison.

4. The method according to claim 1, wherein the first signal comprises information representing a resolution an image currently displayed on a second HMD associated with the second computer.

5. The method according to claim 1, wherein the displaying of the second avatar comprises displaying the second avatar at a first image quality in response to the communication speed being lower than a given speed, and wherein the displaying of the second avatar comprises displaying the second avatar at a second image quality higher than the first image quality in response to the communication speed being equal to or higher than the given speed.

6. The method according to claim 1, further comprising:
  receiving a second signal transmitted from a third computer associated with a third user;
  detecting a second communication speed between the first computer and the third computer based on the second signal;
  comparing the first communication speed with the second communication speed;
  displaying the third avatar at a first image quality in response to the first communication speed being faster than the second communication speed; and
  displaying the third avatar at a second image quality higher than the first image quality in response to the second communication speed being faster than the first communication speed.

7. The method according to claim 1, further comprising:

receiving an input from the first user for selecting the second avatar, wherein the displaying of the second avatar comprises changing the second avatar in response to receiving the input selecting the second avatar to have a different display mode than a third avatar associated with a third user.

8. A system, comprising:

a non-transitory computer readable medium configured to store a program thereon; and a processor connected to the non-transitory computer readable medium, wherein the processor is configured to execute the program for:
  defining a virtual space to be associated with a first user,
  wherein the virtual space comprises a second avatar associated with a second user,
  wherein the first user is associated with a first head-mounted device (HMD) connectable to a first computer;

receiving a first signal from a second computer associated with a second user different from the first user;

detecting a first communication speed between the first computer and the second computer based on the first signal; and instructing the first HMD to display the second avatar in a mode in response to the detected communication speed.

9. The system according to claim 8, wherein processor is configured to instruct the first HMD to display the second avatar in a first mode in response to the communication speed being lower than a given value, and the processor is configured to instruct the first HMD to display the second avatar in a second mode, different from the first mode, in response to the communication speed being equal to or higher than the given value.

10. The system according to claim 8, wherein the processor is further configured to execute the program for:

receiving a second signal transmitted from a third computer associated with a third user;

detecting a second communication speed between the first computer and the third computer based on the second signal;

comparing that the first communication speed with the second communication speed; and instructing the first HMD to display a third avatar associated with the third user in the virtual space in a mode in response to results of the comparison, instructing the first HMD to display the second avatar in a mode in response to the results of the comparison.

11. The system according to claim 8, wherein the first signal comprises information representing a resolution an image currently displayed on a second HMD associated with the second computer.

12. The system according to claim 8, wherein the processor is configured to execute the program for:

instructing the first HMD to display the second avatar at a first image quality in response to the communication speed being lower than a given speed, and instructing the first HMD to display the second avatar at a second image quality higher than the first image quality in response to the communication speed being equal to or higher than the given speed.

13. The system according to claim 8, wherein the processor is configured to execute the program for:

receiving a second signal transmitted from a third computer associated with a third user;

detecting a second communication speed between the first computer and the third computer based on the second signal;

comparing the first communication speed with the second communication speed;

instructing the first HMD to display the third avatar at a first image quality in response to the first communication speed being faster than the second communication speed; and instructing the first HMD to display the third avatar at a second image quality higher than the first image quality in response to the second communication speed being faster than the first communication speed.

14. The system according to claim 8, wherein the processor is configured to execute the program for:

receiving an input from the first user for selecting the second avatar, wherein instructing the first HMD to change the second avatar in response to receiving the input selecting the second avatar to have a different display mode than a third avatar associated with a third user.

15. A method comprising:

receiving, by a first computer, a first signal from a second computer, wherein the second computer is associated with a second user;

receiving, by the first computer, a second signal from a third computer, wherein the third computer is associated with a third user;

comparing a first communication speed between the first computer and the second computer with a second communication speed between the first computer and the third computer;

displaying a second avatar, associated with the second user, in a first mode, wherein the first mode is determined based on the comparison; and displaying a third avatar, associated with the third user, in a second mode different from the first mode, wherein the second mode is determined based on the comparison.

16. The method according to claim 15, wherein the displaying of the third avatar comprises displaying the third avatar having a higher resolution in response to the second communication speed being better than the first communication speed.

17. The method according to claim 15, wherein the displaying of the second avatar comprises displaying the second avatar having a higher transparency in response to the second communication speed being better than the first communication speed.

18. The method according to claim 15, wherein the displaying of the second avatar comprises displaying the second avatar having a different color than the third avatar, and the color of the second avatar is determined based on the comparison.

19. The method according to claim 15, wherein the displaying of the second avatar comprises displaying the second avatar having a smaller size than the third avatar in response to the second communication speed being better than the first communication speed.

20. The method according to claim 15, wherein the displaying of the third avatar comprises alerting a first user of the first computer of results of the comparison.

* * * * *